(12) United States Patent
Zopf

(10) Patent No.: US 10,043,523 B1
(45) Date of Patent: Aug. 7, 2018

(54) ADVANCED PACKET-BASED SAMPLE AUDIO CONCEALMENT

(71) Applicant: Cypress Semiconductor Corporation, San Jose, CA (US)

(72) Inventor: Robert Zopf, Rancho Santa Margarita, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 15/720,702

(22) Filed: Sep. 29, 2017

Related U.S. Application Data

(60) Provisional application No. 62/520,706, filed on Jun. 16, 2017.

(51) Int. Cl.
*G10L 19/005* (2013.01)
*H04L 29/06* (2006.01)
*H04N 19/895* (2014.01)
*H04N 19/60* (2014.01)
*H04L 1/00* (2006.01)

(52) U.S. Cl.
CPC .......... *G10L 19/005* (2013.01); *H04L 1/0011* (2013.01); *H04L 1/0041* (2013.01); *H04L 1/0045* (2013.01); *H04L 1/0071* (2013.01); *H04L 65/60* (2013.01); *H04L 65/604* (2013.01); *H04N 19/60* (2014.11); *H04N 19/895* (2014.11)

(58) Field of Classification Search
CPC .... G10L 19/005; H04L 65/604; H04N 19/895
See application file for complete search history.

(56) References Cited

U.S. PATENT DOCUMENTS

| | | | | |
|---|---|---|---|---|
| 4,815,132 A | * | 3/1989 | Minami | H04H 20/88 379/202.01 |
| 5,257,257 A | * | 10/1993 | Chen | H04L 12/407 370/203 |
| 6,510,173 B1 | * | 1/2003 | Garmonov | H04L 1/0071 375/141 |
| 6,775,240 B1 | * | 8/2004 | Zhang | H04L 43/0829 370/248 |
| 8,208,654 B2 | | 6/2012 | Coutinho et al. | |
| 8,867,752 B2 | | 10/2014 | Virette et al. | |
| 9,026,434 B2 | | 5/2015 | Greer et al. | |
| 9,160,487 B2 | | 10/2015 | Banks et al. | |
| 9,237,407 B2 | | 1/2016 | Hudson et al. | |
| 9,454,968 B2 | | 9/2016 | Boehlke | |
| 9,626,975 B2 | | 4/2017 | Harma et al. | |
| 9,681,236 B2 | | 6/2017 | El-Hoiydi et al. | |
| 2004/0030561 A1 | * | 2/2004 | Chen | G06F 3/16 704/500 |

(Continued)

FOREIGN PATENT DOCUMENTS

CN 102842337 A 12/2012

OTHER PUBLICATIONS

Vacher, Michel, "The Sweet-Home Speech and Multimodal Corpus for Home Automation Interaction," Sweet-Home Project, pp. 4499-4506; 8 pages.

*Primary Examiner* — Joseph D Torres

(57) ABSTRACT

In a reliable multi-cast, a concealment scheme may be applied to recover or conceal lost or otherwise corrupted packets of audio information for one channel based on the audio information of other channels in the reliable multi-cast.

6 Claims, 11 Drawing Sheets

(56) References Cited

U.S. PATENT DOCUMENTS

| | | | |
|---|---|---|---|
| 2004/0039464 A1* | 2/2004 | Virolainen | G11B 20/00992 700/94 |
| 2014/0088976 A1* | 3/2014 | Zhao | G10L 19/008 704/500 |
| 2017/0125027 A1 | 5/2017 | Filippini et al. | |

* cited by examiner

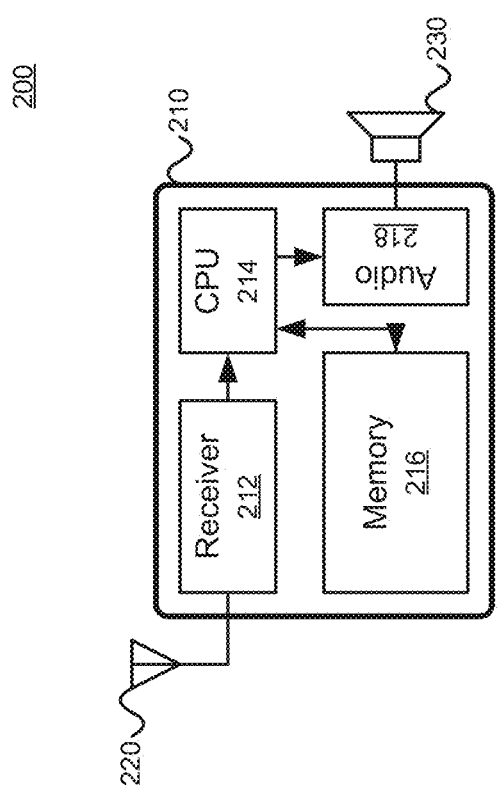

ADVANCED PACKET-BASED SAMPLE AUDIO CONCEALMENT

RELATED APPLICATIONS

This patent application claims the benefit of U.S. Provisional Patent Application No. 62/520,706 filed Jun. 16, 2017, which is incorporated by reference herein in their entirety.

TECHNICAL FIELD

The present disclosure relates generally to embedded systems, and more particularly wireless audio playback.

DESCRIPTION OF THE DRAWINGS

FIG. 2 illustrates a receive circuit for receipt of wireless audio information and playback, according to one embodiment.

SUMMARY

In a first embodiment, the present invention is directed to a method for concealing lost or otherwise corrupted packets of audio information by receiving packets of information through a wireless communication protocol. The packets of information may correspond to a plurality of channels, each channel corresponding to a speaker or other device. A correlation factor may be determined for the channels, either in pairs or as a whole, and packets that are lost or otherwise corrupted may be recovered or concealed by applying a concealment scheme based on correlated channels. In one embodiment, all channels may be used by the concealment scheme. In this embodiment, the correlation factor may be used to weight each of the channels as the concealment scheme is applied.

A second embodiment of the present invention may include a number of speakers, each configured to receive audio information for channels corresponding toe ach of the speakers through a reliable multi-cast wireless communication protocol. A transmitter may send the audio information over the reliable multicast. Speakers of the number of speakers may calculate correlation factors for information for the various channels of the reliable multi-cast and apply a concealment scheme using audio information from other channels when packets of audio information are lost or otherwise corrupted.

In another embodiment of the present invention, a speaker may include a receiver circuit for receiving audio information from a transmitter, the audio information including packets for several channels of a reliable multi-cast. The transmitted and receiving of audio information may be over a wireless communication protocol. The speaker may include a processor circuit to determine a correlation factor for the audio information for the channels of the reliable multi-cast and to apply a concealment scheme to replace or reconstruct lost or otherwise corrupted packets of audio information based on the correlation factor.

DETAILED DESCRIPTION

Figure 1:
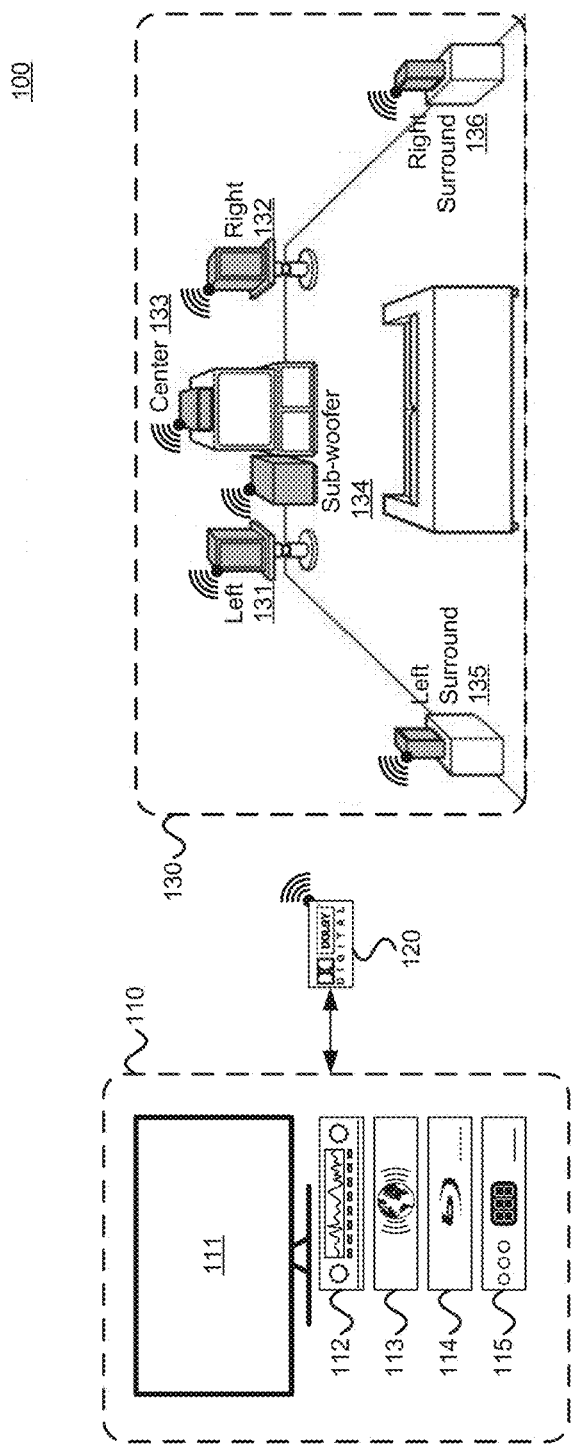
FIG. 1 illustrates a system for wireless audio playback, according to one embodiment.

FIG. 1 illustrates a system 100 for audio playback. System 100 may include a number of audio sources 110 including a television 111 or other display device, an audio amplifier 112, an internet-connected audio receiver 113, a Blu-ray player 114 or another digital video player, or a set-top box 115. In other embodiments, system 100 may include other devices configured to play audio information. Audio sources 110 may be coupled to a wireless transmitter 120, which may convert audio signals from the various devices in audio sources 110 to a wireless protocol for speakers in sound system 130. Sound system 130 may include left speaker 131, right speaker 132, and center speaker 133. Sound system 130 may also include a sub-woofer 134, also referred to a low frequency effects (LFE) speaker. Sound system 130 may also include a left surround sound speaker 135 and a right surround sound speaker 136.

The speakers of sound system 130 may include a circuit for receiving and playing audio information. FIG. 2 illustrates one embodiment of a circuit for receiving wireless audio information and playing sound corresponding to that wireless audio information. Circuit 200 may include an integrated circuit 210 coupled to an antenna for receiving wireless information and a speaker 230 for generating sound waves corresponding to the audio information. Integrated circuit 210 may include a receiver for receiving wireless audio information from antenna 220 and converting that wireless information into a format that may be processed by CPU 214. CPU 214 may be coupled to memory 216, which may store programs executed by CPU 214 as well as correlation information for channels from wireless transmitter 120. CPU 214 may also be coupled to audio driver 218 for conversion of audio information into electrical pulses to control speaker 230 for the production of sound.

Returning to FIG. 1, wireless transmitter 120 may be configured to broadcast audio information for channels corresponding to each of the speakers in sound system 130. In one embodiment, individual speakers of sound system 120 may be configured to receive only the channel associated with their location (or ID). In another embodiment, the speakers of sound system 130 may be configured to receive audio information using reliable multi cast (RMC).

In reliable multi cast, every channel is received by every receiver. Because each channel is received by each receiver, a concealment approach may be implemented that uses channels not specifically assigned to a given receiver to conceal or recover lost packets.

Audio information in each channel may be different. However, there may be enough correlation across some or all of the channels. In some cases, audio information for multiple channels may be identical. In others, correlation between channels may be sufficient to conceal or recover lost packets of information based on all or some of the channels for which packets were not lost. Correlation or redundancy may be exploited by a concealment scheme represented by some function, F, in the following equation:

$$\hat{x} = F(C_1, C_2, \ldots, C_T), \quad (1)$$

where $\hat{x}$ is a vector of estimate of missing channels in a block, F is a function representative of a concealment scheme, $C_i$ is the $i^{th}$ channel, and T is the total number of channels in the multi-cast.

Figure 3A:
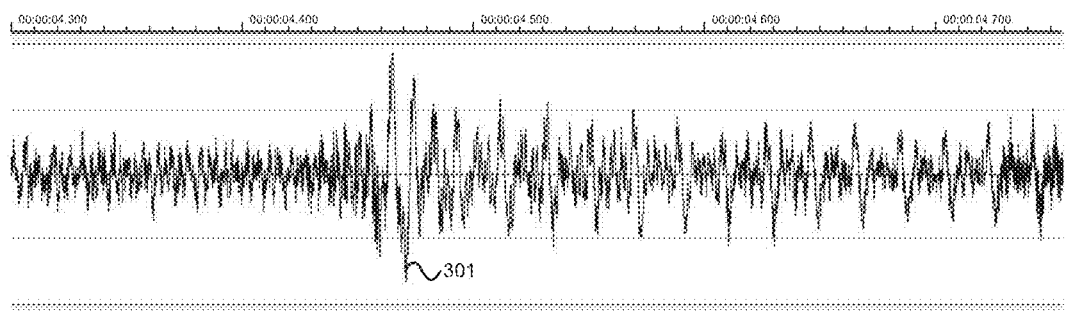
FIG. 3A illustrates audio information for a speaker, according to one embodiment.
Figure 3B:
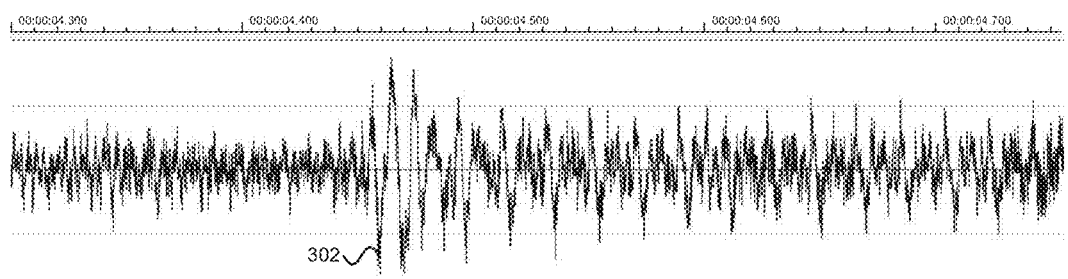
FIG. 3B illustrates audio information for a speaker, according to one embodiment.

The methods of multi-channel recording and the recording conditions thereof provide some guidance into optimizing a multi-channel concealment scheme. FIG. 3A illustrates a portion of a song ("These Are Days" by Natalie Merchant) for two channels corresponding to a left speaker 301 (FIG. 3A; Channel 1) and a right speaker 302 (FIG. 3B; Channel 2). The correlation between the left and right speakers 301 and 302 (channels 1 and 2) is evident. In some cases, the relationship between channels may be more complex. However, to a first order a useful model may be created using a linear (or non-linear) transform and a phase shift. Samples for the left and right speakers may be given by:

$$xl_n \approx F_{rl}(xr_{n+n_0}), \quad (2)$$

and $$xr_n \approx F_{lr}(xl_{n-n_0}), \quad (3)$$

where $xl_n$ is the $n^{th}$ sample for the right channel, $xr_n$ is the $n^{th}$ sample for the right channel, F is a transfer function, and $n_0$ is the time shift between the channels.

While the example of FIG. 3 was recorded in a studio and was therefore likely mixed by a studio engineer, live stereo recording can be potentially modeled as well.

Figure 4A:
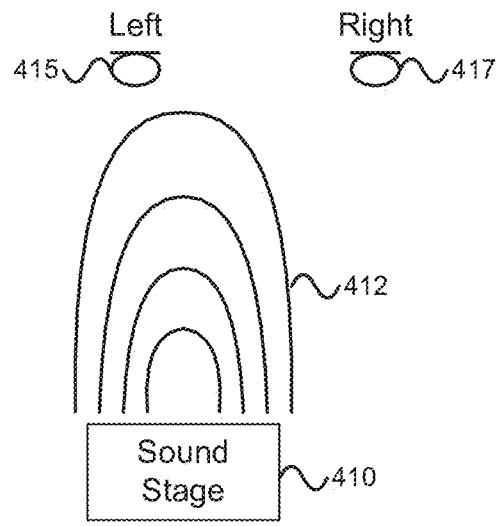
FIG. 4A illustrates a recording scheme for a sound stage, according to one embodiment.
Figure 4B:
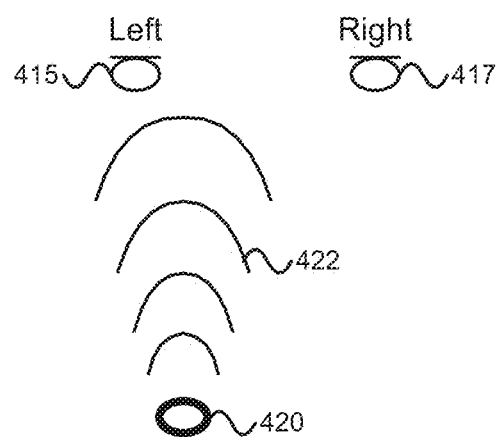
FIG. 4B illustrates a recording scheme for a point source, according to one embodiment.

FIGS. 4A and 4B illustrate recording methods for live music that is played from a sounds stage (FIG. 4A) and a point source (FIG. 4B). In FIG. 4A, sound stage 410 may serve as the source of the music and sound 412 may be received by left microphone 415 and right microphone 417 according to their position relative to sound stage 410. In FIG. 4B, point source 420 may serve as the source of the music and sound 422 may be received by left microphone 415 and right microphone 417 according to their position relative to point source 420.

In the Examples of FIGS. 4A and 4B, sound (audio) reaching left microphone 415 and right microphone 417 may have a time of arrival difference that may lead to a delay between the channels. The orientation of microphones 415 and 417 in relation to sound stage 410 and point source 420 is also different. The differences in time of arrival and orientation may be modeled into the transfer function, F, of equations 2 and 3.

Figure 5A:
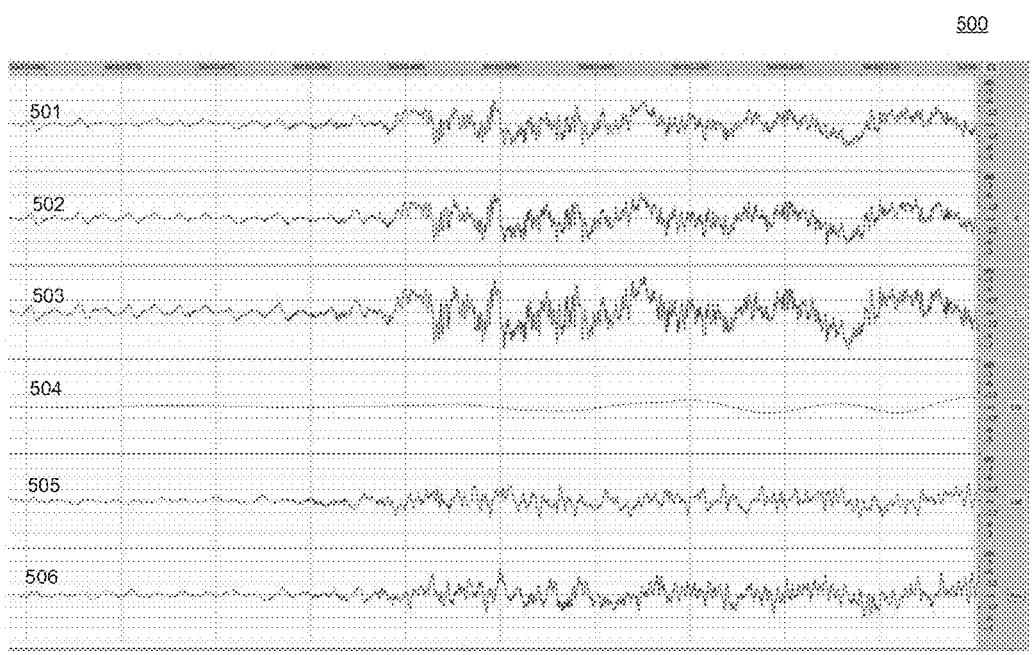
FIG. 5A illustrates audio information for a plurality of channels with cross correlation illustrated for some of the channels, according to one embodiment.

In more complex audio recordings, there may be significant correlation between some channels and very little correlation between others. FIG. 5A illustrates a 5.1 audio example 500 ("Video Idols"). There is significant correlation between channels corresponding to the left speaker (501), the right speaker (502) and the center speaker (503). However, there is very little visually noticeable correlation between channels for the left, right, and center speakers and the low frequency effects (LFE) channel 504. While the correlation between left, right, and center speakers and LFE channel 504 is not visually noticeable, there may be more correlation if the left, right, and center speaker channels were subjected to a low-pass filter. Audio example 500 may also include a left surround direct (Lsd) channel 505 and right surround direct (Rsd) channel 506. The correlation between Lsd channel 505 and Rsd channel 506 may be minimal, as shown in the example in FIG. 5. However, in some cases, the correlation between Lsd channel 505 and Rsd channel 506 may be high, while the correlation between Lsd channel 505 and Rsd channel 506 and other channels, such as left, right, and center speakers is minimal.

Figure 5B:
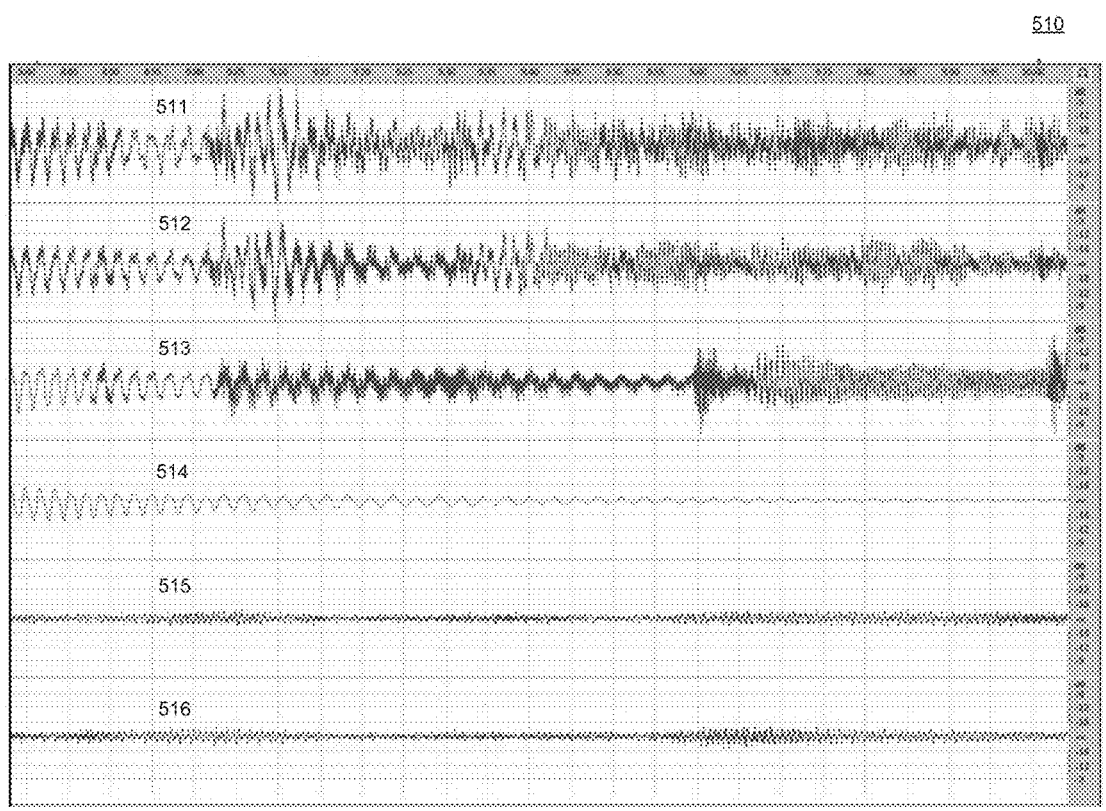
FIG. 5B illustrates audio information for a plurality of channels with cross correlation illustrated for some of the channels, according to one embodiment.

FIG. 5B illustrates another 5.1 audio example 510 that demonstrates cross correlation between left channel 511 and right channel 512, but very little cross correlation between left channel 511 and right channel 512 and center channel 513. 5.1 audio example may show some low band cross correlation between center channel 513 and LFE 514. A similar lack of cross correlation between Lsd 515 and Rsd 516 may exist in audio example 510 as can be observed for audio example 500.

Figure 6:
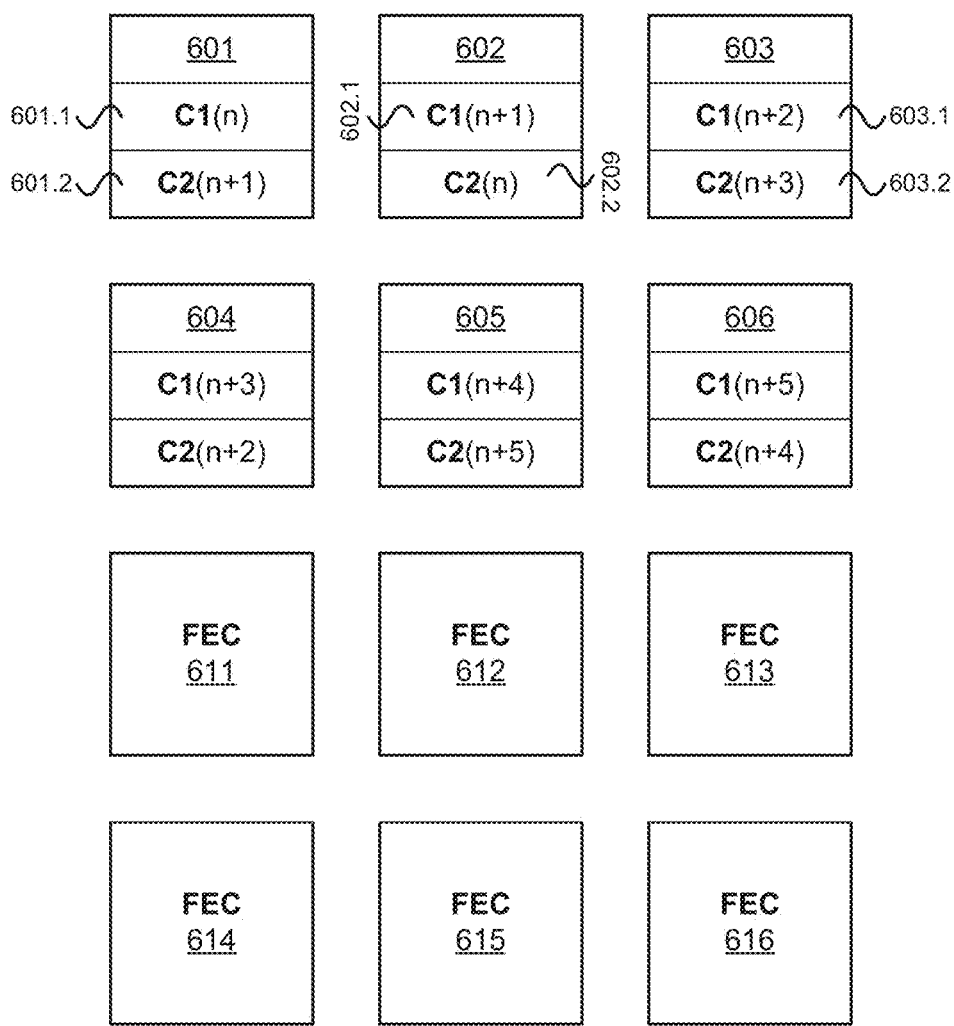
FIG. 6 illustrates a block of audio information including a plurality of interleaved packets, according to one embodiment.

Multi-channel concealment may use interleaving and channel packing to offset channels in time to ensure that correlated channels are available for concealment. FIG. 6 illustrates a simplified version of a 2-channel stereo audio signal 600. 2-channel stereo audio signal 600 may include six packets (601-606) and six forward error correction (FEC) packets (611-616). Packet 601 may contain a frame n 601.1 for channel 1 and a frame n+1 601.2 for channel 2. In one embodiment channels 1 and 2 may correspond to a left channel and a right channel. Packet 602 may contain a frame n+1 602_1 for channel 1 and a frame n 602_2 for channel 2. This pattern of interleaving may continue through the interleaving group of audio signal 600.

In the example of FIG. 6, if a packet is lost, the time frame may still be available in an adjacent packet for another channel. For example, if packet 602 is lost, then concealment or recovery of frame n+1 602.1 for channel 1 may be aided by using frame n+1 601.2 of packet 601. Similarly, concealment or recovery of frame n 602.2 for channel 2 may be aided by using from n 601.1 of packet 601.

While an interleaving scheme is shown with just two channels in FIG. 6, similar interleaved offset channel packing may be used in more complex audio signals including a greater number of channels, different delay constraints, more or less FEC, etc.

As shown in FIGS. 3 and 5A and 5B, cross correlation between channels may be different between channels and between the same channels over time. As the correlation between two channels may be different at one time that it is at another, it may be preferable to ensure the concealment scheme is reflective of a cross correlation that is contemporaneous to the lost packet. To this end, the concealment scheme of a mapping function thereof may be updated in time.

Figure 7:
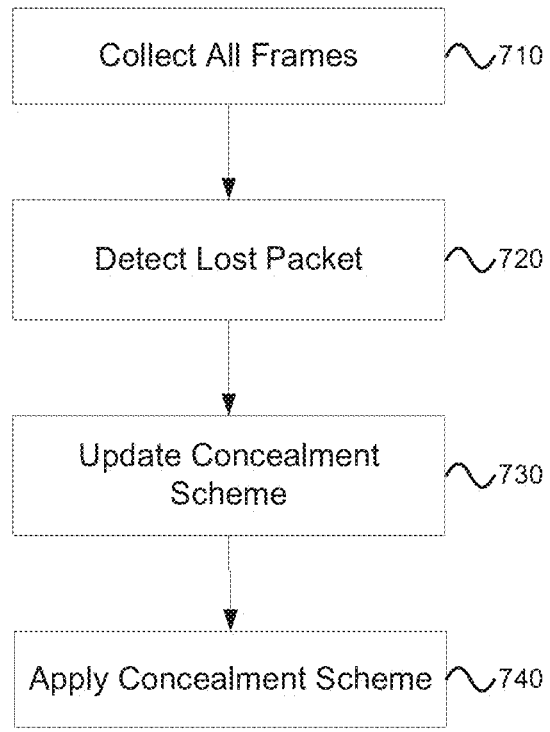
FIG. 7 illustrates a method for detecting and concealing a lost packet of audio information, according to one embodiment.

FIG. 7 illustrates a method 700 for applying a concealment scheme in situations where correlation between channels over time. In step 710, all the frames are collected, including those with good and bad packets. In step 720, a bad or lost packet is detected, necessitating the application of a concealment or recovery scheme. In step 730, prior or future frames (in time) are used to update the mapping function or concealment or recovery scheme taking into consideration the cross correlation of the channels and other closeness measures. After the mapping function or concealment or recovery scheme is updated in step 730, it is applied in step 740 to recover or conceal the bad or lost packet.

As an example, if packet 603 of FIG. 6 is lost, frames n+2 603.1 and n+3 603.2 must be concealed (or recovered). To conceal the lost frame, in one embodiment, all of the data in every channel may be used according to:

$$\widehat{Cu}_{(l)} = F(C_i(k_i)),  \quad (4)$$

where $\widehat{Cu}$ (l) is the concealment vector for the $u^{th}$ channel of time l, $C_i$ are the channels in the multicast, $k_i$, are all the known frames for channel i, and F is the concealment scheme function.

Figure 8:
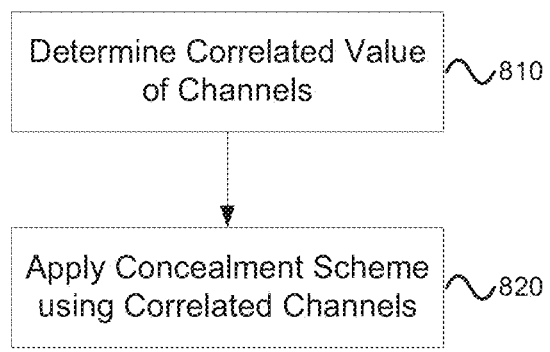
FIG. 8 illustrates a method for applying a concealment scheme, according to one embodiment.

The concealment of the lost frame packets (603 in the above example) may be implemented according method 800 of FIG. 8. First, the correlation of each channel to the others may be determined in step 810. This may be done similar to method 700 of FIG. 7 by looking at the channels over time. Next, the concealment scheme may be applied using some or all of the channels based on the determined cross correlation between the channels. In one embodiment, all of the channels may be used to conceal the lost packet. In this embodiment, certain channels may be given greater weight in the concealment scheme based on higher calculated correlation. In another embodiment, a subset of the channels may be used. In this embodiment, the channels used in the concealment scheme may be determined by using the channels with the highest correlation value. In another embodiment, the channels used in the concealment scheme may be hard-coded based on the system configuration. For example, channels corresponding to left and right may be default correlated such that if a packet is lost for the left channel, the right channel is used in the concealment scheme.

Step 810 of method 800 may be performed using audio both before and after the lost packet. For example, if frames n+1, n+2, n+3, or n+4 are lost, frames before and after are present in the current or previous interleaving block (or packet). In this case, the frames may be used in the concealment scheme (and to update the mapping function) without a delay. However, if a frame corresponding to n+5 is lost, only prior frames are available since a frame corresponding to n+6 would be contained in the next interleaving block. There may be excessive delay and buffering required to use a frame in the next interleaving block.

In one embodiment, the cross correlation or other likeness criterion may be performed after or in consideration of a transformation between the channels according to equations (2) and (3) above. The transformation may be updated using good frames that are part of packets that are not lost and received in an interleaving block associated with the packets under test and with good frames that are part of packets that were not lost and received in prior interleaving blocks. The mapping function or transformation between two channels may be given by:

$$Ci^{Tiu} = Tiu(C_i). \quad (5)$$

Where Tiu is some function that maps channel Ci to Cu, wherein u is the channel that is being concealed in frame I. Tiu may map channel Ci to Cu in a manner that minimizes a distortion measure $D^T$ between the channels. Tiu may be given by:

$$Tiu = \underset{T}{\operatorname{argmin}} \{D^T(Ci^{Tij}, Cu)\}. \quad (6)$$

The concealment function may therefore be determined as that function that minimizes distortion measure $D^T$ when applying the function to the transformed channels $Ci^{Tiu}$ to obtain and estimate of the lost channel (or packet of the channel). In one embodiment, a measure of likeness may be maximized, rather than a distortion measure minimized. Cu(n) may be used as long as n≠l, where l is the lost frame. In the case of determining the concealment function, n may not equal the frame l for which the distortion is being computed. The concealment function may be given by:

$$F^l = \underset{F}{\operatorname{argmin}} \{D^F(Ci^{Tij}, Cu)\}, \quad (7)$$

for frames that are available and for which good frames are present for Cu.

Once the concealment function is selected and the subset of $Ci^{Tiu}$ is identified for use, the concealment may then be applied according to:

$$\widehat{Cu}_{(l)} = F^l(C_i^{Tiu}(k_i)). \quad (8)$$

Figure 9:
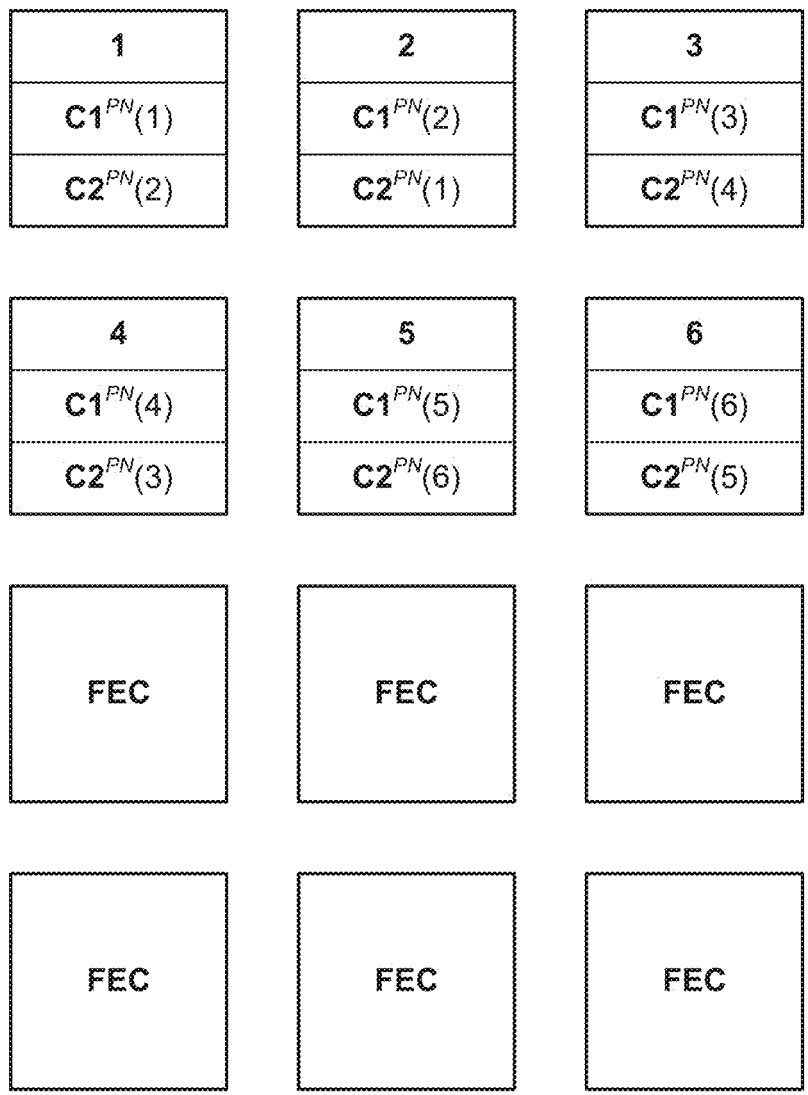
FIG. 9 illustrates a block of audio information including a plurality of interlaced packets, according to one embodiment.

In another embodiment, interlacing may be used such that samples between channels may be offset within the same packet. FIG. 9 illustrates an embodiment of an example packing scheme for a stereo configuration using interlacing. If a packet is lost, time instances lost may be packed in another packet for a different channel and may exploited if that packet is received.

Figure 10:
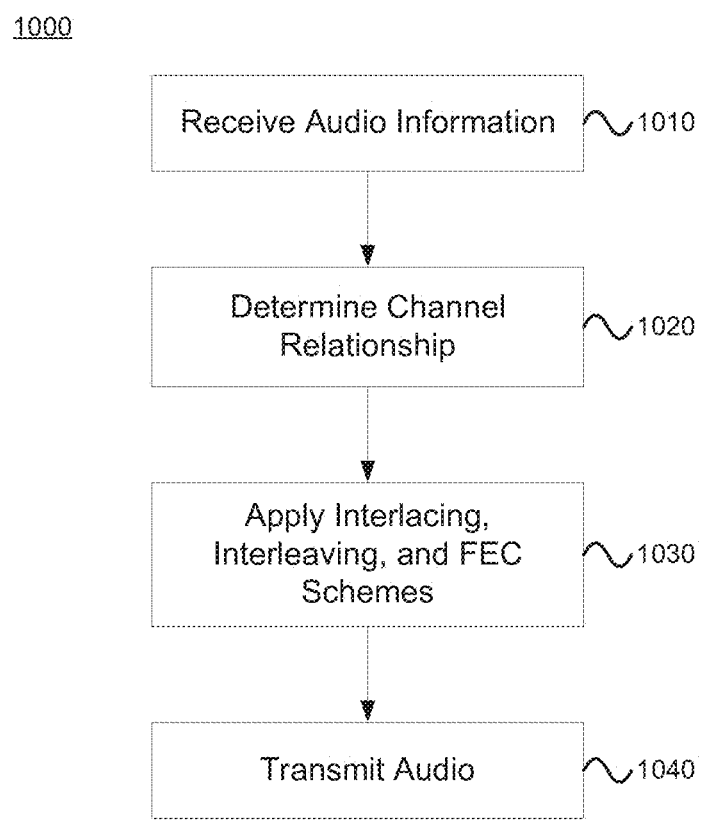
FIG. 10 illustrates a method for generated wireless audio information, according to one embodiment.

FIG. 10 illustrate a method 1000 for applying a multi-channel concealment scheme according to the above description. Audio information, including packets of audio information is received in step 1010. Audio information for all channels may be received in step 1010. In one embodiment, audio information for a left channel and a right channel may be received. In other embodiments, more complex audio information may be received including a right channel, a left channel, a center channel, a LFE channel, a Lsd channel, and an Rsd channel. In still other embodiments, more or less audio channels may be received. A relationship between each of the channels may be determined in step 1020. The relationship may be a cross correlation metric (or factor) that is calculated from past and/or present data and updated over time. Step 1020 may determine which channels are best used together for concealment in the method of FIG. 11, described below. Which channels are best used together for concealment may be determined based on the cross correlation metric (or factor) by comparing it to a threshold. If the correlation between channels is high enough, the channels may be used for concealment. If the correlation between channels is not high enough, channels with low correlation may be excluded from the concealment function. In one embodiment, the correlation between two channels may be great enough that the packet (or information) from one channel may be used by a channel that lost a packet (or for which the audio information is otherwise corrupted). In another embodiment, the correlation metric (or factor) may be used as a weighting function for the concealment scheme.

The channel relationship may be defined by the known origin of the audio, by measuring the cross correlation, detecting redundancy, or some other technique for defining or detecting the relationship at the source and/or receiver. In another embodiment, a mapping function of the audio information may be used to determine the relationship of the various channels.

Interleaving, interlacing, and/or FEC schemes may be applied in step 1030 based on the channel relationships as well as system requirements or constraints with regard to signal transmission delay, bandwidth, jitter, or other system-level considerations. The audio signal may then be transmitted to the receivers in step 1040.

Figure 11:
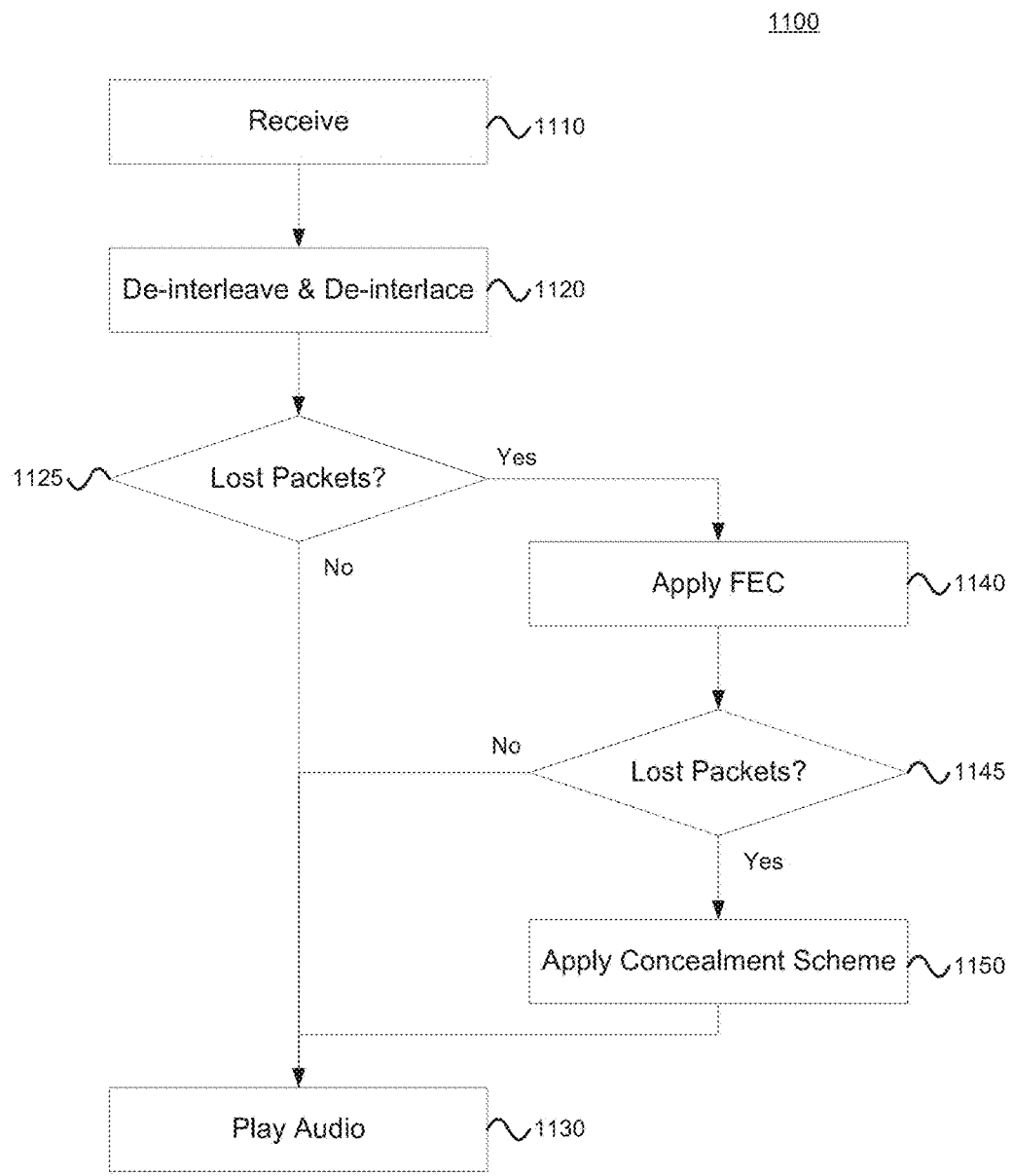
FIG. 11 illustrates a method concealing lost packets of audio information, according to one embodiment.

FIG. 11 illustrates a method 1100 of playing audio information received from step 1040 of FIG. 10. Audio information is first received in step 1110. Audio information for all channels may be received by the various receivers in the system. De-interleaving and deinterlacing are applied in step 1020, corresponding to the interleaving and interlacing applied in step 1030. Interleaving and interlacing (and the deinterleaving and deinterlacing of step 1120) may serve to spread out packet loss, thus making concealment easier. If no lost packets are discovered in decision step 1125, audio from the audio information may be played in step 1130. If lost packets are discovered in decision step 1125, an FEC scheme may be applied in step 1140. If the FEC scheme was successful in recovering the lost packets and no lost packets are discovered in decision step 1145, audio from the audio information may be played in step 1130. If the FEC scheme was not successful and there are lost packets detected in decision step 1145, a concealment scheme may be applied in step 1150.

The concealment scheme of step 1150 may be determined by the receiver based on the channel relationships from step 1020 in one embodiment. In another embodiment, cross correlation analysis may be applied to define the concealment scheme. The concealment scheme may be defined by the transmitter in one embodiment or it may be determined by the receiver. The concealment scheme may be fixed or it may be dynamic. Certain portions of the concealment scheme may be fixed, while others may be determined on-the-fly.

In one embodiment, if a correlation factor representative of the correlation between two channels is below a threshold, the concealment scheme may use audio information from a different channel that has a higher correlation factor. In another embodiment, the concealment scheme may use a correlation factor as a weight applied to the various channels. The correlation factor may be determined by evaluating the audio information on the various channels in the RMC over time.

After the concealment scheme is applied in step 1150, the reconstructed (concealed) audio signal may be played in step 1130.

The multi-channel concealment scheme described herein may be implemented in Wi-Fi headsets, to which a stereo signal is transmitted, received, and played. The high correlation exhibited by stereos may be particularly suited to using the multi-channel concealment scheme. In another embodiment, the multi-channel concealment scheme may be implemented in a Bluetooth wireless speaker system. The limited bandwidth of Bluetooth may necessitate encoded audio signals. In this embodiment, a Bluetooth receiver may first decode the audio signals before performing the correlation analysis and the concealment scheme.

In the above description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "encrypting," "decrypting," "storing," "providing," "deriving," "obtaining," "receiving," "authenticating," "deleting," "executing," "requesting," "communicating," "initializing," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Specific commands ore messages referenced in relation to the above-described protocol are intended to be illustrative only. One of ordinary skill in the art would understand that commands of different specific wording but similar function may be used and still fall within the ambit of the above description.

Embodiments described herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented or referenced herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth above are merely exemplary. Particular implementations may vary from these exemplary details and still be contemplated to be within the scope of the present invention.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. An audio system comprising:
a first speaker to play audio from a first channel;
a second speaker to play audio from a second channel;
a transmitter for sending audio information to the first speaker and the second speaker, the audio information including packets for the first channel and the second channel,
wherein the first speaker is to:
determine a first correlation factor between first channel and a second channel,
determine if a first packet for the first channel is a lost packet, and
if a first packet for the first channel is a lost packet, applying a concealment scheme,
wherein if the first correlation factor is above a threshold, the concealment scheme applies a second packet for the second channel to the first packet of the first channel, and
wherein if the first correlation factor is below the threshold, the concealment scheme applies a third packet to the first packet of the first channel, wherein the third packet is derived from a fourth packet and a fifth packet for the first channel, the fourth and fifth packets separated in time from the lost packet.

2. The audio system of claim 1, wherein the first speaker determines the first correlation factor to be applied for packets that are lost for the first channel, and wherein the second speaker determines a second correlation factor to be applied for packets that are lost for the second channel.

3. The audio system of claim 1, wherein the first correlation factor is communicated to the first speaker and the second speaker by the transmitter.

4. The audio system of claim 1 further comprising a third speaker to play audio from a third channel, and wherein the audio information further includes packets for the third channel.

5. The audio system of claim 4, wherein the third speaker determines a third correlation factor for the first channel and the third channel.

6. The audio system of claim 5, wherein the third correlation factor is different from the first correlation factor.

* * * * *